US011514417B2

(12) United States Patent
Thacker et al.

(10) Patent No.: US 11,514,417 B2
(45) Date of Patent: Nov. 29, 2022

(54) SYSTEMS AND METHODS FOR OPERATING A BRIDGE SERVER TO SUPPORT MULTIPLE SHARDS OF A BLOCKCHAIN

(71) Applicant: Mythical, Inc., Sherman Oaks, CA (US)

(72) Inventors: Cameron Thacker, Sherman Oaks, CA (US); Andrew Royer, Los Angeles, CA (US); Rudy Koch, Seattle, WA (US)

(73) Assignee: Mythical, Inc., Sherman Oaks, CA (US)

( * ) Notice: Subject to any disclaimer, the term of this patent is extended or adjusted under 35 U.S.C. 154(b) by 0 days.

(21) Appl. No.: 16/949,190

(22) Filed: Oct. 19, 2020

(65) Prior Publication Data
US 2022/0118365 A1 Apr. 21, 2022

(51) Int. Cl.
| | |
|---|---|
| G06Q 20/12 | (2012.01) |
| G06F 16/27 | (2019.01) |
| G06Q 20/38 | (2012.01) |
| G06F 21/10 | (2013.01) |
| A63F 13/792 | (2014.01) |

(52) U.S. Cl.
CPC ......... *G06Q 20/1235* (2013.01); *G06F 16/27* (2019.01); *G06F 21/10* (2013.01); *G06Q 20/389* (2013.01); *A63F 13/792* (2014.09); *G06F 2221/0713* (2013.01)

(58) Field of Classification Search
CPC .............. G06Q 20/00–425; G06F 16/00–986
See application file for complete search history.

(56) References Cited

U.S. PATENT DOCUMENTS

| | | | |
|---|---|---|---|
| 6,085,169 A | 7/2000 | Walker | |
| 10,692,325 B2 | 6/2020 | Simons | |
| 10,740,733 B2 * | 8/2020 | Moir | ........................ G06F 16/27 |
| 10,850,202 B1 | 12/2020 | Koch | |
| 10,861,095 B1 | 12/2020 | Koch | |
| 10,872,367 B1 | 12/2020 | Stoddard | |

(Continued)

OTHER PUBLICATIONS

Janice Podsada; "With Sales of Virtual Goods, The Reality Is Serious Revenue"; Jan. 7, 2009; Tribune Content Agency LLC (Year: 2009) (3 pages).

(Continued)

*Primary Examiner* — Mohammad A. Nilforoush
(74) *Attorney, Agent, or Firm* — Esplin & Associates, PC (57) ABSTRACT

Systems and methods for operating a bridge server to support multiple shards of blockchains are disclosed. The multiple shards may be used to record ownership rights of in-game digital assets. The in-game digital assets may be usable in an online gaming platform. Exemplary implementations may: execute an instance of a game; maintain user accounts for the users of a blockchain on a first and a second decentralized ledger server; record sets of rights pertaining to sets of digital assets; receive an exchange request for a first digital asset; receive transferal information for the first digital asset; transfer sets of instructions to the first and second decentralized ledger servers such that the first decentralized ledger server removes the first digital asset from the first set of digital assets and the second decentralized ledger server adds the first digital asset to the second set of digital assets.

6 Claims, 4 Drawing Sheets

(56) References Cited

U.S. PATENT DOCUMENTS

| | | |
|---|---|---|
| 10,946,291 B1 | 3/2021 | Harris |
| 10,984,400 B1 | 4/2021 | Koch |
| 11,062,284 B1 | 7/2021 | Cunningham |
| 11,138,580 B1 | 10/2021 | Koch |
| 2002/0123938 A1 | 9/2002 | Yu |
| 2007/0087831 A1 | 4/2007 | Van Luchene |
| 2011/0302037 A1 | 12/2011 | Sutton-Shearer |
| 2012/0015699 A1 | 1/2012 | Kalvachev |
| 2012/0030069 A1 | 2/2012 | Garg |
| 2013/0110720 A1 | 5/2013 | Rekhi |
| 2014/0335948 A1 | 11/2014 | Jung |
| 2015/0170112 A1 | 6/2015 | Decastro |
| 2016/0292680 A1 | 10/2016 | Wilson, Jr. |
| 2017/0083959 A1 | 3/2017 | Bousis |
| 2017/0148264 A1 | 5/2017 | Pichette |
| 2018/0078843 A1 | 3/2018 | Tran |
| 2018/0114403 A1 | 4/2018 | Jayachandran |
| 2018/0117447 A1 | 5/2018 | Tran |
| 2018/0204260 A1 | 7/2018 | McGregor |
| 2018/0205740 A1 | 7/2018 | Clark |
| 2018/0247191 A1 | 8/2018 | Katz |
| 2018/0276630 A1 | 9/2018 | Kim |
| 2019/0005595 A1 | 1/2019 | Tautenhan |
| 2019/0205873 A1 | 7/2019 | Kamalsky |
| 2019/0220836 A1 | 7/2019 | Caldwell |
| 2019/0236605 A1 | 8/2019 | McHale |
| 2019/0282906 A1 | 9/2019 | Yong |
| 2019/0295371 A1 | 9/2019 | Simons |
| 2019/0303892 A1 | 10/2019 | Yantis |
| 2019/0311341 A1* | 10/2019 | Rice .............. G07G 1/0009 |
| 2019/0340623 A1 | 11/2019 | Rivkind |
| 2019/0354945 A1 | 11/2019 | Mahajan |
| 2019/0361917 A1 | 11/2019 | Tran |
| 2019/0386969 A1 | 12/2019 | Verzun |
| 2020/0005284 A1 | 1/2020 | Vijayan |
| 2020/0013048 A1 | 1/2020 | Love |
| 2020/0026548 A1* | 1/2020 | Huang .............. G06F 9/466 |
| 2020/0074853 A1* | 3/2020 | Miller .............. G06F 16/182 |
| 2020/0097927 A1 | 3/2020 | Groarke |
| 2020/0184041 A1* | 6/2020 | Andon .............. A63F 13/71 |
| 2020/0202668 A1 | 6/2020 | Cotta |
| 2020/0211092 A1 | 7/2020 | Sarin |
| 2020/0273048 A1 | 8/2020 | Andon |
| 2020/0320623 A1 | 10/2020 | McGrath |
| 2021/0118085 A1 | 4/2021 | Bushnell |
| 2021/0279695 A1 | 9/2021 | Rice |

OTHER PUBLICATIONS

Zheng Qin, "Introduction to E-commerce", 2009, Springer, springer.com (Year: 2009), pp. 298-301.

Game X coin launches first blockchain game platform: Korea-based startup aims to disrupt the video game industry with game cryptocurrency. (Aug. 2, 2018). NASDAQ OMX's News Release Distribution Channel (Year: 2018) Retrieved from https://search.proquest.com/wire-feeds/game-x-coin-launches-first-blockchain-platform/docview20/81459699/se-2?accountid=14753 (Year: 2018) (2 pages).

Game X coin launches first blockchain game platform: Korea-based startup aims to disrupt the video game industry with game cryptocurrency. (Aug. 2, 2018). NASDAQ OMX's News Release Distribution Channel (Year: 2018) Retrieved from https:// search.proquest.com/wire-feeds/game-x-coin-launches-first-blockchain-platfor.

Siira, Erkki, et al. Designing and Implementing Common Market for Cross-Game Purchases between Mobile Games. Bled eConference. 2017. pp. 1-16.

* cited by examiner

SYSTEMS AND METHODS FOR OPERATING A BRIDGE SERVER TO SUPPORT MULTIPLE SHARDS OF A BLOCKCHAIN

FIELD OF THE DISCLOSURE

The present disclosure relates to systems and methods for operating a bridge server to support multiple shards of blockchains, the multiple shards being used to record ownership rights of in-game digital assets, the in-game digital assets being usable in an online gaming platform.

BACKGROUND

Online gaming platforms are known. Users of online gaming platforms exchanging digital in-game assets to other users is known. Decentralized ledgers are known.

SUMMARY

One aspect of the present disclosure relates to a system configured for operating a bridge server to support multiple shards of blockchains. The multiple shards may be used to record ownership rights of in-game digital assets. The in-game digital assets may be usable in an online gaming platform. The system may include an online gaming platform, a first decentralized ledger server, a second decentralized ledger server, a bridge server, and/or other components. The online gaming platform may be configured to host one or more games. The online gaming platform may be provided, at least in part, by one or more game servers that include one or more processors configured by machine-readable instructions. The processors may be configured to execute an instance of a first online game to facilitate presentation of the first online game to users, and implement in-game actions in the instance of the first online game in response to action requests for the in-game actions by the users. The presentation of the first online game may include the presentation of views of the first online game that are determined using information generated by execution of the instance of the first online game. The users may include a first user and a second user that interact with the online gaming platform. The first decentralized ledger server may be configured to implement a first node of a first shard of a first blockchain. The first decentralized ledger server may include one or more processors configured by machine-readable instructions to (i) maintain user accounts for the users of the first blockchain, including the first user and the second user; (ii) record, on the first shard, a first set of rights pertaining to a first set of digital assets, wherein the recorded first set of rights reflect ownership of a first digital asset by the first user, wherein the first digital asset is usable within the online gaming platform; and (iii) receive instructions to modify the recorded first set of rights. The second decentralized ledger server may be configured to implement a second node of a second shard of the first blockchain. The second decentralized ledger server may include one or more processors configured by machine-readable instructions to (i) maintain user accounts for the users of the first blockchain, including the first user and the second user; (ii) record, on the second shard, a second set of rights pertaining to a second set of digital assets, wherein the recorded second set of rights reflect ownership of a second digital asset by the first user, wherein the second digital asset is usable within the online gaming platform; and (iii) receive instructions to modify the recorded second set of rights. The bridge server may include one or more processors configured by machine-readable instructions. The bridge server may receive, from the first user, an exchange request that indicates the first user offers the first digital asset for a first transferal to one of the users. The bridge server may receive transferal information regarding the first transferal of the first digital asset from the first user to the second user. The bridge server may, responsive to receipt of the transferal information, transfer a first set of instructions to the first decentralized ledger server and a second set of instructions to the second decentralized ledger server. The one or more processors of the first decentralized ledger server may be configured to (i) receive the first set of instructions from the bridge server, and (ii) in accordance with the received first set of instructions, remove the first digital asset from the first set of digital assets, such that the recorded first set of rights on the first shard no longer reflect the ownership of the first digital asset by the first user. The one or more processors of the second decentralized ledger server are further configured to (i) receive the second set of instructions from the bridge server, and (ii) in accordance with the received second set of instructions, add the first digital asset to the second set of digital assets, such that the recorded second set of rights on the second shard reflect the ownership of the first digital asset by the second user.

Another aspect of the present disclosure relates to a method for operating a bridge server to support multiple shards of blockchains. The multiple shards may be used to record ownership rights of in-game digital assets. The in-game digital assets may be usable in an online gaming platform. The method may include executing an instance of a first online game to facilitate presentation of the first online game to users, and implementing in-game actions in the instance of the first online game in response to action requests for the in-game actions by the users, wherein the presentation of the first online game includes the presentation of views of the first online game that are determined using information generated by execution of the instance of the first online game, wherein the users include a first user and a second user that interact with the online gaming platform. The method may include maintaining, by a first decentralized ledger that implements a first node of a first shard of a first blockchain, user accounts for the users of the first blockchain, including the first user and the second user. The method may include recording, on the first shard, a first set of rights pertaining to a first set of digital assets, wherein the recorded first set of rights reflect ownership of a first digital asset by the first user, wherein the first digital asset is usable within the online gaming platform. The method may include receiving, by the first decentralized ledger, instructions to modify the recorded first set of rights. The method may include maintaining, by a second decentralized ledger that implements a second node of a second shard of the first blockchain, user accounts for the users of the first blockchain, including the first user and the second user. The method may include recording, on the second shard, a second set of rights pertaining to a second set of digital assets, wherein the recorded second set of rights reflect ownership of a second digital asset by the first user, wherein the second digital asset is usable within the online gaming platform. The method may include receiving, by the second decentralized ledger, instructions to modify the recorded second set of rights. The method may include receiving, from the first user, an exchange request that indicates the first user offers the first digital asset for a first transferal to one of the users. The method may include receiving transferal information regarding the first transferal of the first digital asset from the first user to the second user. The method may include, responsive to receipt of the transferal information, transferring a first set of instructions to the first decentralized ledger server and a second set of instructions to the second decentralized ledger server. The method may include receiving the first set of instructions. The method may include, in accordance with the received first set of instructions, removing the first digital asset from the first set of digital assets, such that the recorded first set of rights on the first shard no longer reflect the ownership of the first digital asset by the first user. The method may include receiving the second set of instructions. The method may include, in accordance with the received second set of instructions, adding the first digital asset to the second set of digital assets, such that the recorded second set of rights on the second shard reflect the ownership of the first digital asset by the second user.

Another aspect of the present disclosure relates to a system for operating a bridge server to support multiple shards of blockchains. The system may include an online gaming platform, a bridge server, and/or other components. The online gaming platform may be configured to host one or more games. The online gaming platform may be provided, at least in part, by one or more game servers that include one or more processors configured by machine-readable instructions. The processors may be configured to execute an instance of a first online game to facilitate presentation of the first online game to users, and implement in-game actions in the instance of the first online game in response to action requests for the in-game actions by the users, wherein the presentation of the first online game includes the presentation of views of the first online game that are determined using information generated by execution of the instance of the first online game, wherein the users include a first user and a second user that interact with the online gaming platform. The bridge server may include processors configured to interact with a first node that is dedicated to a first shard of a first blockchain. The first shard (i) maintains user accounts for the users of the first blockchain, including for the first user and the second user, (ii) records a first set of rights pertaining to a first set of digital assets, wherein the recorded first set of rights reflect ownership of a first digital asset by the first user, wherein the first digital asset is usable within the online gaming platform, and (iii) receives instructions from the bridge server to modify the recorded first set of rights. The bridge server may include processors configured to interact with a second node that is dedicated to a second shard of the first blockchain. The second shard (i) maintains user accounts for the users of the first blockchain, including for the first user and the second user, (ii) records a second set of rights pertaining to a second set of digital assets, wherein the recorded second set of rights reflect ownership of a second digital asset by the first user, wherein the second digital asset is usable within the online gaming platform, and (iii) receives instructions from the bridge server to modify the recorded second set of rights. The bridge server may be configured to receive, from the first user, an exchange request that indicates the first user offers the first digital asset for a first transferal to one of the users. The bridge server may be configured to receive transferal information regarding the first transferal of the first digital asset from the first user to the second user. The bridge server may be configured to, responsive to receipt of the transferal information, transfer a first set of instructions to the first node and a second set of instructions to the second node. The first node may (i) receive the first set of instructions from the bridge server, and (ii) in accordance with the received first set of instructions, remove the first digital asset from the first set of digital assets, such that the recorded first set of rights on the first shard no longer reflect the ownership of the first digital asset by the first user. The second node may (i) receive the second set of instructions from the bridge server, and (ii) in accordance with the received second set of instructions, add the first digital asset to the second set of digital assets, such that the recorded second set of rights on the second shard reflect the ownership of the first digital asset by the second user.

As used herein, any association (or relation, or reflection, or indication, or correspondency) involving platforms, servers, processors, shards, nodes, client computing platforms, assets, exchanges, transferals, offers, transactions, interactions, in-game actions, rights, benefits, ownership, users, accounts, metrics, metric values, scores, periods, instructions, operations, determinations, distributions, presentations, notifications, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
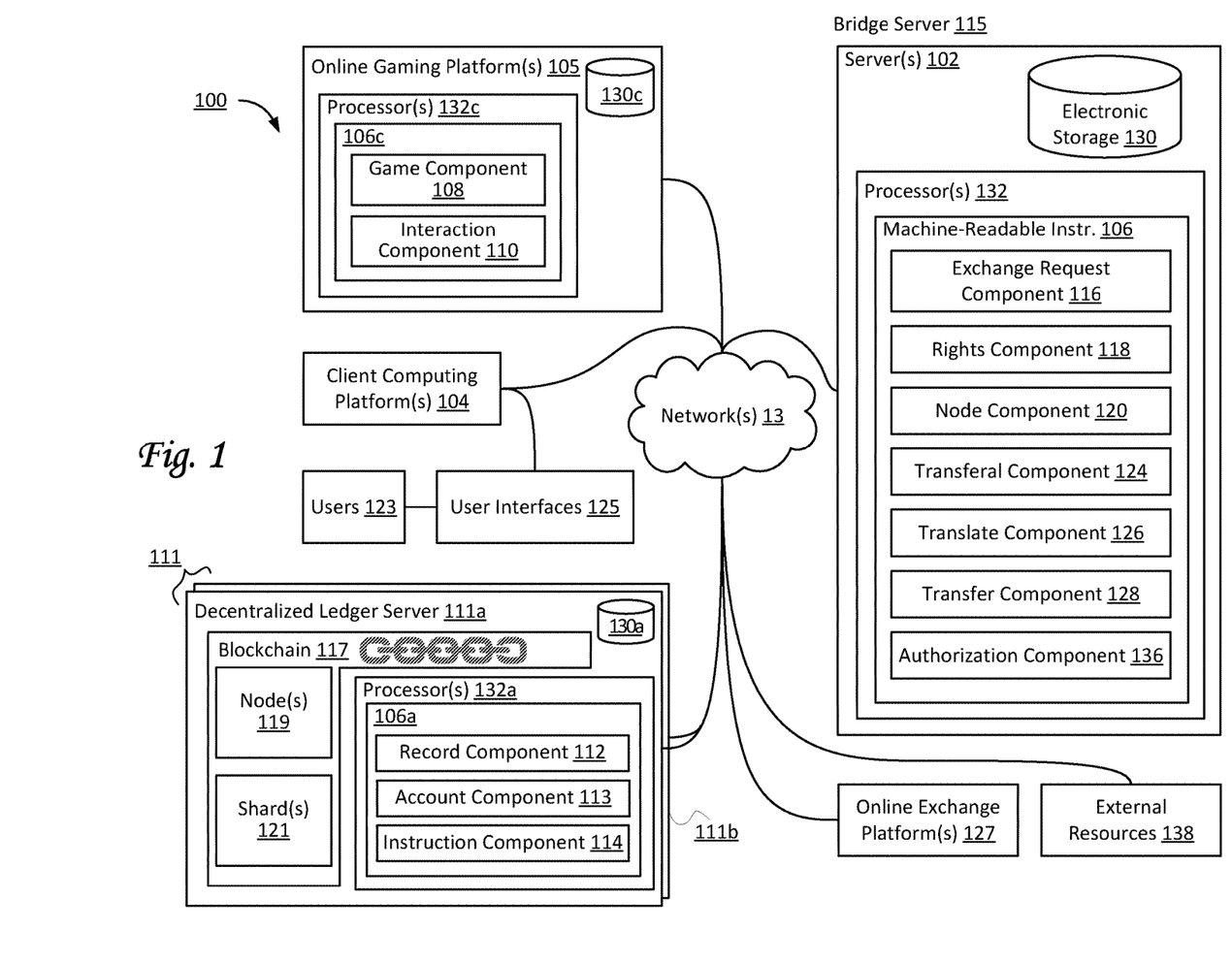
FIG. 1 illustrates a system configured for operating a bridge server to support multiple shards of blockchains, in accordance with one or more implementations.

FIG. 1 illustrates a system 100 configured for operating a bridge server 115 to support multiple shards 121 of blockchain(s) 117, in accordance with one or more implementations. Individual blockchains 117 may include multiple shards 121 such that individual shards 121 can independently complete at least some types of transactions, without significant computational costs for other shards of the same individual blockchain 117. Accordingly, the capacity for completing (at least some types of) transactions may increase as the number of shards increases (and provided that the communication overhead for communication between shards and synchronization among shards is limited so that the corresponding detrimental effect of this communication on the transactional capacity is less than the increase gained in transactional capacity due to sharding). As used in the examples in this disclosure, individual blockchains 117 may include 2 or 3 shards, but that number is exemplary and not intended to be limiting. In some implementations, individual blockchains 117 may include 3, 4, 5, 10, 50, 100, 500, 1000, or more shards. The communication overhead may be handled and/or performed by bridge server 115.

In some implementations, blockchain 117 may be maintained by a distributed computing platform (not shown in FIG. 1). In some implementations, the distributed computing platform may be implemented by a set of client computing platforms and/or servers (including, for example, one or more decentralized ledger servers 111). The distributed computing platform may support a virtual machine (not shown in FIG. 1). The distributed computing platform and/or the virtual machine may form a runtime environment for smart contracts and/or other executable code. In some implementations, the distributed computing platform may include electronic storage configured to store part or all of blockchain 117. The smart contracts may be stored on blockchain 117. In some implementations, the distributed computing platform may be the EOSIO platform. In some implementations, the distributed computing platform may be Ethereum. In some implementations, the distributed computing platform may be similar to Ethereum. In some implementations, the virtual machine may be a decentralized virtual machine.

Blockchain 117 may be configured to record rights pertaining to digital assets. A given (digital) asset may be owned by a particular user. An asset may include anything of material value or usefulness that is owned by or on behalf of one or more users. In some implementations, a virtual item (that may be used within gaming platform 105 and/or may be useful within gaming platform 105) may be represented by a digital asset that is recorded on blockchain 117. In some implementations, a right pertaining to an object (e.g., a distribution right) may be an asset, the object being a physical or a virtual item. Multiple rights may form a set of rights or a bundle of rights that may be transferred and/or otherwise acted on and/or operated on together. For example, rights may include one or more of a right to use, a right to sell, a right to destroy, a right to certain types of distributions, and/or other rights. For example, in some implementations, rights pertaining to a virtual item (e.g., ownership) may be recorded on blockchain 117.

In some implementations, tokens may be a type of asset. In some implementations, tokens may include one or more of security tokens, utility tokens, payment tokens, initial coin offering (ICO) tokens, virtual currency tokens, crypto tokens, ERC-20 tokens, EOS tokens, and/or other tokens. In some implementations, tokens not only represent value, but may have a specific use in a particular distributed computing platform, e.g., in the operation of blockchain 117.

In some implementations, blockchain 117 may register transactions that modify ownership (and/or other rights) pertaining to digital assets. A smart contract may implement a (type of) digital asset. In some implementations, once a smart contract has been added to a blockchain, the smart contract may be referred to as published, posted, registered, and/or recorded. Elements of blockchain 117 may be grouped together in units that are referred to as blocks. For example, an individual block may include one or more assets and one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more assets, one or more transactions, and/or other information.

In some implementations, blockchain 117 may be publicly accessible and append-only. In some implementations, existing blocks of blockchain 117 can substantially not be altered or deleted, unless multiple copies are altered. This is unlikely to happen provided that the multiple copies stored on different computing platforms, e.g., in different geographical locations. Blockchain 117 may be replicated on multiple computing platforms, preferably in multiple different geographical locations. Additionally, individual blocks may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, transactions, and/or assets may be digitally signed in a manner that proves integrity and/or prevents tampering, e.g., by providing authentication.

In some implementations, blockchain(s) 117 and/or multiple shards 121 of these blockchain(s) 117 may be used to record ownership rights of in-game digital assets, including but not limited to digital assets that are not fungible. The in-game digital assets may be usable in an online gaming platform 105. In some implementations, system 100 may be configured to control bridge server 115 to support and/or interact with multiple nodes 119 that are dedicated to shards 121 of blockchain(s) 117. In some implementations, digital assets may be (or represent) virtual items that are usable within one or more online gaming platforms 105. For example, some digital assets may represent user-controllable three-dimensional in-game characters that can interact with other virtual items within online gaming platform 115. In some implementations, virtual items may include one or more of weapons, toys, characters, abilities, skills, tools, pets, clothing, vehicles, game levels, missions, assignments, chapters, tasks, mini-games, restricted areas within a virtual space, restricted modes of gameplay, access rights within an online game, and/or other virtual items. In some implementations, virtual items may refer to any item or object within gaming platform 105 that a user may use, own, sell, trade, destroy, and/or otherwise effectuate a change of ownership of.

As used herein, a digital asset is fungible if it is functionally and/or otherwise indistinguishable from another digital asset. For example, a payment token such as a Bitcoin may be a fungible digital asset. A digital asset may be non-fungible if it is unique, or one-of-a-kind. For example, a specific individual CryptoKitty™ may be a non-fungible digital asset. A digital asset may be semi-fungible if there is a set of a limited number of similar but distinguishable digital assets. For example, a limited-edition Blanko™ or another in-game character may be a semi-fungible digital asset. For example, one of a limited number of 2-dimensional or 3-dimensional in-game virtual items may be a semi-fungible digital asset. For example, a digital ticket to a show, concert, exhibition, and/or other event may be a semi-fungible digital asset. For example, a piece of art or jewelry (e.g., as a virtual item or as representing a physical item) may be a semi-fungible digital asset. As used herein, both non-fungible and semi-fungible digital assets are considered as "not fungible" digital assets. In some implementations, semi-fungible digital assets may share the same or similar data as other digital assets, but have at least a unique identifier, and/or other distinguishable asset-specific information.

In some implementations, digital assets may be usable within one or more games. Instances of the games may be executed within one or more online gaming platforms 105. As used herein, online gaming platform 105 may refer to either an individual game (e.g., an interactive online game), a type of gaming console and its ecosystem, and/or both. Online gaming platform 105 may be operated, hosted, and/or owned by one or more stakeholders of online gaming platform 105. For example, a platform operator (and/or another stakeholder) may sell digital in-game assets (e.g., characters, weapons, resources, etc.) to users 123 of online gaming platform 105. However, such a sale is not a player-to-player exchange. In some implementations, the term "exchanges" may refer to player-to-player actions that facilitate individual players to auction, sell, purchase, trade, barter, transfer, and/or otherwise exchange digital assets. In other words, individual players may own individual virtual items, and exchange these items with other individual players by virtue of the systems and methods described in this disclosure. Due to an exchange, ownership of a digital asset transitions from an original owner to a new owner (even if there may, in some implementations, be one or more intermediary and/or temporary owners during the process of performing the exchange). In some implementations, player-to-player exchanged may be considered non-commercial, since there may be no commercial interest in such a transaction, nor a commercial party involved as a principal participant to the transaction.

In some implementations, a particular blockchain 117 (that, e.g., registers in-game digital assets and/or ownership rights thereof) may be sharded into different shards 121 in different ways. In some implementations, individual shards may be user-specific (or rather, specific to a subset of users) such that an individual user account uses (or corresponds to) a particular shard, and a different user account uses a different shard. In some implementations, individual shards may be asset-specific (or rather, specific to a subset of in-game assets) such that an individual in-game asset uses (or corresponds to) a particular shard, and a different in-game asset uses a different shard. In some implementations, individual shards may be game-specific (or rather, specific to a subset of the games hosted within online gaming platform 105) such that an individual game uses (or corresponds to) a particular shard, and a different game uses a different shard. For example, in a user-specific shard, a set of in-game assets may be shared, synced, and/or otherwise operative on multiple shards (and, e.g., a particular user account is using just one shard). For example, in an asset-specific shard, a set of users (or rather, a set of user accounts) may be shared, synced, and/or otherwise operative on multiple shards (i.e., the same users or user accounts are used on multiple shards, and, e.g., a particular asset is registered on just one shard). For example, in a game-specific shard, a set of users (or rather, a set of user accounts) may be shared, synced, and/or otherwise operative on multiple shards (i.e., the same users or user accounts may be used on multiple shards, and, e.g., assets for a particular game are registered on just one shard). In some implementations, a particular shard may be both user-specific and asset-specific, or, e.g., both game-specific and asset-specific.

In some implementations, system 100 may include one or more of an bridge server 115, one or more online gaming platforms 105, one or more decentralized ledger servers 111, one or more online exchange platforms 127, electronic storage 130, one or more servers 102, one or more client computing platforms 104, one or more user interfaces 125, one or more external resources 138, and/or other components. Users 123 (also referred to as players) may include one or more of a first user, a second user, a third user, a fourth user, and/or other users.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users 123 may access system 100 via client computing platform(s) 104.

In some implementations, system 100 and/or server(s) 102 may be configured to communicate with one or more of online gaming platform(s) 105, decentralized ledger server(s) 111, bridge server 115, users 123, and/or other components. Users 123 may include players who play and/or otherwise interact on online gaming platform 105. In some implementations, online gaming platform 105 may include an online store or exchange that facilitates exchanges of digital assets. In some implementations, users can exchange digital assets (such as, e.g., in-game virtual items) through one or more external exchange platforms 127, including but not limited to eBay™.

Bridge server 115 may include one or more of electronic storage 130, server(s) 102, processor(s) 132, machine-readable instructions 106, and/or other components. Server(s) 102 may be configured by machine-readable instructions 106. Machine-readable instructions 106 may include one or more instruction components. The instruction components may include computer program components. The instruction components may include one or more of a game component 108, an interaction component 110, a record component 112, an account component 113, an instruction component 114, an exchange request component 116, a rights component 118, a node component 120, a transferal component 124, a translate component 126, a transfer component 128, an authorization component 136, and/or other instruction components. The depiction in FIG. 1 of certain components being arranged, organized, and/or otherwise included in other components is merely exemplary, and not intended to be limiting.

In some implementations, online gaming platforms 105 may include one or more of electronic storage 130c, server(s) 102 (not depicted in FIG. 1), processor(s) 132c, machine-readable instructions 106c, and/or other components. Electronic storage 130c may be similar to electronic storage 130 as described elsewhere in this disclosure, though included in online gaming platforms 105. Processor(s) 132c may be similar to processor(s) 132 as described elsewhere in this disclosure, though included in online gaming platforms 105. Machine-readable instructions 106c may be similar to machine-readable instructions 106 as described elsewhere in this disclosure, though included in online gaming platforms 105.

In some implementations, decentralized ledger server(s) 111 may include one or more decentralized ledger servers, including but not limited to decentralized ledger server 111a, decentralized ledger server 111b, and so forth. Decentralized ledger server 111a and decentralized ledger server 111b may include similar elements. For example, decentralized ledger server 111a may include one or more of electronic storage 130a, server(s) (not depicted in FIG. 1), processor(s) 132a, machine-readable instructions 106a, and/or other components.

In some implementations, an individual decentralized ledger server (e.g., decentralized ledger server 111a) may include (e.g., implement) one or more blockchains 117. For example, the individual decentralized ledger server may be dedicated to a particular blockchain 117, which may be a private and/or permissioned blockchain.

In some implementations, an individual decentralized ledger server (e.g., decentralized ledger server 111a) may include one or more nodes 119 of one or more blockchains 117. For example, the individual decentralized ledger server may be dedicated to a particular node 119 of a particular blockchain 117. Typically, different nodes are included in (or implemented by, or hosted by) different servers or different computer systems to increase the safety and security of transactions on a blockchain. The consensus protocol used for a particular blockchain may be harder to falsify or circumvent when the different nodes are in different geographical locations, on different types of computing platforms, and/or otherwise distributed and diverse.

In some implementations, an individual decentralized ledger server (e.g., decentralized ledger server 111a) may include one or more shards 121 of one or more blockchains 117. For example, the individual decentralized ledger server may be dedicated to a particular shard 121 of a particular blockchain 117. In some implementations, the individual decentralized ledger server may be dedicated to a particular shard 121 of a particular node 119 of a particular blockchain 117. In some implementations, a particular blockchain 117 may be implemented by different nodes 119 such that individual nodes are subsequently sharded into multiple shards 121. Alternatively, and/or simultaneously, in some implementations, a particular blockchain 117 may be sharded into multiple shards 121 such that individual shards are subsequently implemented by different nodes 119. This implementation may be preferred to reduce the requirements for an individual node, in particular the communication overhead. In implementations that use different shards 121, bridge server 115 may be configured to support and/or provide communication to and between different shards 121, to provide synchronization between different shards 121, to control operations and joint functionality of the different shards 121, and/or otherwise manage shards 121 such that users of a particular blockchain 117 can abstract from the particular implementation of sharding.

Electronic storage 130a may be similar to electronic storage 130 as described elsewhere in this disclosure, though included in a particular decentralized ledger server(s) 111. Processor(s) 132a may be similar to processor(s) 132 as described elsewhere in this disclosure, though included in a particular decentralized ledger server(s) 111. Machine-readable instructions 106a may be similar to machine-readable instructions 106 as described elsewhere in this disclosure, though included in a particular decentralized ledger server(s) 111.

Game component 108 may be configured to execute an instance of a game (e.g., an online game within online gaming platform 105) to facilitate presentation of the online game to users 123. In some implementations, game component 108 may be configured to implement in-game actions in the instance of the game, e.g., in response to action requests for the in-game actions by users 123. In some implementations, game component 108 may be arranged, organized, and/or otherwise included in online gaming platform 105. As used herein, the term "game" may refer to one or more games within gaming platform 105. The game may be provided via a virtual space, and may include a plurality of resource types and/or maps. An instance of the virtual space may be executed by one or more computer components to determine views of the virtual space. In some implementations, the view may be communicated (e.g., by streaming, via object/position data, and/or other information) from server(s) 102 and/or other sources to client computing platforms 104 for presentation to users 123. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. In some implementations, one or more view parameters may be selectable by a user.

The instance of the game may include a simulated space that is accessible by users 123 by clients (e.g., client computing platforms 104) that present the views of the virtual space to a user. The simulated space may have a topography, express ongoing real-time interaction by one or more users 123, and/or include one or more objects positioned within the topography that are capable of locomotion and/or movement within the topography. In some implementations, the topography may be a 2-dimensional topography. In some implementations, the topography may be a 3-dimensional topography. The topography may include dimensions of the simulated space, and/or surface features of a surface or objects that are native to the simulated space. In some implementations, the topography may include a surface (e.g., a ground surface) that runs through at least a substantial section of the simulated space. In some implementations, the topography may describe a volume with one or more bodies positioned therein. The instance executed by the computer components may be synchronous, asynchronous, and/or semi-synchronous.

Within the instance of the game, users 123 may control characters, objects, simulated physical phenomena, and/or other elements within the virtual space to interact with the virtual space and/or each other. The user characters may include avatars. As used herein, the term "user character" may refer to an object or group of objects present in the virtual space, that correspond(s) to an individual user. A particular user character may be controlled by the particular user with which it is associated. Such user characters may be referred to as user-controlled characters. User-controlled element(s) may move through and interact with the virtual space (e.g., non-user characters in the virtual space, other objects in the virtual space, etc.). User-controlled elements controlled by and/or associated with a given user may be created and/or customized by the given user. Individual users 123 may have an "inventory" of virtual goods and currency (e.g., resources of the plurality of resource types) that the individual user can use (e.g., by manipulation of a user character and/or other user-controlled elements) and/or other items, to perform in-game actions within the virtual space. In some implementations, user inventories may be managed using one or more decentralized ledger servers 111. For example, ownership of individual virtual items included in an individual user inventory may be recorded on a particular blockchain that is implemented on decentralized ledger server 111a. In some implementations, individual user inventories (and/or digital assets therein) may correspond to individual smart contracts stored on decentralized ledger server 111 and/or blockchain 117.

Interaction component 110 may be configured to facilitate interaction between users 123 within online gaming platform 105, and, in particular, within instances of the online games that are executed by game component 108. For example, interaction component 110 may facilitate interaction by a particular user with other users within an instance of a particular online game. For example, the interaction may include user-controlled in-game actions by a particular digital asset that are controlled by the particular user. In some implementations, the interaction may occur subsequent to temporarily transferring ownership of the particular digital asset from an original owner (e.g., to the particular user). In some implementations, one or more particular types of interaction may be facilitated by interaction component 110. For example, interaction may be limited to certain types of in-game actions. In some implementations, interaction may be limited to a certain time or period. In some implementations, interaction component 110 may be arranged, organized, and/or otherwise included in online gaming platform 105.

In some implementations, interaction component 110 may facilitate interaction by a particular user with other users within online gaming platform 105, through a particular digital asset that is being controlled by the particular user during a particular period, even though the particular user is not (yet) the non-temporary owner of the particular digital asset. For example, the particular period may start when the particular user commits to the exchange involving the particular digital asset, or when the particular user provides the benefit in exchange for the particular digital asset, and/or at another predefined moment during the exchange process. For example, the particular period may end at the moment a determination has been made regarding reversibility of the exchange involving the particular digital asset. In some implementations, one or more types of ownership rights are temporarily transferred to the particular user during the particular period. For example, one of the types of ownership rights may give the particular user the right to use the particular digital asset in certain limited ways. For example, usage may be limited to one or more types of in-game actions. For example, the allowed one or more types of in-game actions may exclude in-game actions that inflict damage to (or even destroy) the particular digital asset.

Account component 113 may be configured to maintain user accounts for the users of one or more decentralized ledger servers 111 and/or components thereof. For example, account component 113 may maintain users accounts for a first user, a second user, a third user, and so forth of a particular blockchain 117. In some implementations, account component 113 may maintain similar user accounts (e.g., for the same one or more users) for different nodes 119 and/or different shards 121. For example, in implementations that support asset-specific sharding, the same user may own different digital assets that are stored and/or recorded on different nodes 119 and/or different shards 121.

Record component 112 may be configured to record rights pertaining to digital assets on one or more decentralized ledger servers 111 and/or components thereof. In some implementations, record component 112 may record rights on a particular blockchain 117 (or a particular shard 121, or a particular node dedicated to a particular shard 121) implemented by, e.g., decentralized ledger server 111a. The rights may include ownership rights, distribution rights, and/or other rights. For example, particular recorded rights may reflect ownership of a particular digital asset by a particular user. For example, the particular digital asset may be not fungible, and may represent a three-dimensional in-game user-controllable character that can interact with other virtual items within online gaming platform 105. Recorded rights may be asset-specific. For example, distribution rights for a particular digital asset may designate rights to certain distributions of benefits upon an exchange involving the particular digital asset. For example, the asset-specific distribution rights for a particular digital asset may include one or more of (i) a right owned by a different user to a part of the benefits upon an exchange, (ii) a right owned by one or more stakeholders of online gaming platform 105 to a part of the benefits upon an exchange, (iii) a right owned by one or more stakeholders of bridge server 115 upon an exchange, and/or other distribution rights. These parts of a benefit may have different sizes, percentages, and/or conditions.

In some implementations, record component 112 may be configured to record rights on blockchain 117. In some implementations, record component 112 may add, modify, and/or remove recorded rights. For example, in accordance with received instructions, record component 112 may transfer ownership of a particular digital asset from a first owner to a second owner (e.g., from an original owner to a new owner). In some implementations, in accordance with received instructions, record component 112 may transfer ownership of a particular digital asset temporarily, e.g., from a first owner to a temporary second owner. In some case, a temporary owner may be a holding account that is merely used until ownership is transferred to either the original owner or a new owner. As used herein, the term "temporary" (and derivatives thereof) may refer to a transfer or to ownership that is either known to be changed and/or modified within a predetermined period, or expected to be changed and/or modified within a predetermined period. Conversely, a non-temporary transfer from a first owner to a second owner (due to a particular exchange) can conceivably be changed and/or reverted (back from the second owner to the first owner) due to a separate and new exchange that is independent of the first particular exchange. In some implementations, in accordance with received instructions, record component 112 may transfer ownership of a particular digital asset non-temporarily from a first owner to a second owner, e.g., when a particular exchange is not reversible or no longer reversible. In some implementations, record component 112 may be arranged, organized, and/or otherwise included in one or more decentralized ledger servers 111. A change and/or other modification of recorded rights (e.g., ownership rights) may cause one or more transfers and/or transactions between different shards 121. For example, due a change in ownership, rights pertaining to a particular in-game digital asset may be moved from a first shard to a second shard. For example, due a change in ownership, rights pertaining to a particular in-game digital asset may be moved from a first node of a first shard to a second node of a second shard (e.g., of the same blockchain).

Instruction component 114 may be configured to receive (sets of) instructions. Instruction component 114 may be configured to receive (sets of) instructions for execution. In some implementations, instruction component 114 may be configured to receive instructions to add, modify, and/or remove recorded rights in one or more decentralized ledger servers 111 and/or components thereof. For example, instruction component 114 may receive one or more sets of instructions from, e.g., bridge server 115. In some implementations, instruction component 114 may provide received sets of instructions to record component 112 for execution. In some implementations, instruction component 114 may be arranged, organized, and/or otherwise included in a particular decentralized ledger server 111 and/or components thereof.

Exchange request component 116 may be configured to receive exchange requests from users. An exchange request may indicate a particular user offers a particular digital asset for a transferal to another user. A transferal may be due to different types of events, including but not limited to a gift, a sale, theft, and/or other events. In some implementations, an exchange request may indicate a particular user offers a particular digital asset for a reversible exchange, e.g., on a fiat-currency-based online exchange platform (e.g., online exchange platform 127). In some implementations, bridge server 115 may be configured to keep track on which particular shard 121 the ownership rights to a particular digital asset are recorded. In some implementations, online gaming platform 105 may be configured to keep track on which particular shard 121 the ownership rights to a particular digital asset are recorded.

Rights component 118 may be configured to obtain asset-specific rights (e.g., ownership rights, distribution rights, and/or other rights) for particular digital assets. In some implementations, rights component 118 may be configured to access one or more decentralized ledger servers 111 (or components thereof) to obtain the asset-specific rights (that are recorded, e.g., in one or more smart contracts). In some implementations, rights component 118 may be configured to obtain different sets of rights (at different moments) for the same particular digital asset. For example, rights component 118 may obtain a first set of rights at a first moment during a particular exchange, a second set of rights at a second moment (different from the first moment) during the same particular exchange, and so forth. For example, the rights to a given digital asset as recorded on blockchain 117 may include a first and second distribution right as follows: a 5% distribution right for a user (e.g., the user who designed the particular three-dimensional in-game user-controllable character that is represented by the given digital asset), and a 1% distribution right for a stakeholder of online gaming platform 105, and these distribution rights may be exercised upon completion of an exchange of the given digital asset. In some implementations, rights component 118 may be configured to determine whether rights to a newly created digital asset are recorded on a first shard 121 or a second shard 121.

Transferal component 124 may be configured to receive transferal information regarding transferals of digital assets. In some implementations, transferal component 124 may receive transferal information related to transferals between different users as described in relation to the operation of exchange request component 116. In some implementations, transferal component 124 may be configured to receive information from one or more decentralized ledger servers 111 and/or components thereof. Alternatively, and/or simultaneously, transferal component 124 may be configured to receive information from online gaming platforms 105 and/or online exchange platforms 127. In some implementations, transferal information may be asset-specific, transfer-specific, and/or exchange-specific. For example, particular received transferal information may be regarding a particular transferal of a particular digital asset for a particular benefit. For example, a user may have accepted an offer for exchanging the particular digital asset for $100. In some implementations, transferal component 124 may be configured to receive benefits that correspond to particular transferals. For example, the received transferal information may include the particular benefit. In some implementations, the received transferal information may be related to received benefit. For example, a particular received benefit may correspond to a particular transferal.

Transfer component 128 may be configured to transfer (sets of) instructions to one or more decentralized ledger servers 111 and/or components thereof (including but not limited to instruction component 114 for execution). For example, transfer component 128 may transfer a first set of instructions to a first decentralized ledger server (e.g., decentralized ledger server 111*a*) and a second set of instructions to a second decentralized ledger server (e.g., decentralized ledger server 111*b*). For example, when a particular digital asset is to be moved between different shards 121, the first set of instructions may, in effect, remove the particular digital asset from the set of recorded digital assets recorded on a first shard 121, and the second set of instructions may, in effect, add the particular digital asset to the set of recorded digital assets recorded on a second shard 121.

Node component 120 may be configured to interact with one or more nodes 119. In some implementations, node component 120 may interact with a first node 119 that is dedicated to a first shard 121 of a particular blockchain 117. At the same time, node component 120 may interact with a second node 119 that is dedicated to a second shard 121 of the same particular blockchain 117. An individual shard 121 may be configured to maintain user accounts, record rights pertaining to digital assets, receive instructions from bridge server 115 to modify recorded rights, and/or perform other operations pertaining to the individual shard 121 and/or to an individual node 119 dedicated to the individual shard 121.

Translate component 126 may be configured to translate and/or convert in-game actions that have occurred on online gaming platform 105 into one or more transactions that are (to be) recorded on one or more particular shards. For example, a gift of a particular digital asset within a game (hosted on online gaming platform 105) may be translated into a first transaction to be recorded on a first shard 121 and a second transaction to be recorded on a second shard 121. For example, a discovery or purchase of a new particular digital asset within a particular game may be translated into a transaction to be recorded on a particular shard 121, e.g., to issue the particular asset using a function of a particular smart contract that creates the particular asset. For example, the destruction of a particular digital asset within a particular game may be translated into a transaction to be recorded on a particular shard 121, e.g., to burn the particular asset using a function of the same smart contract that was used to create or issue the particular asset. In some implementations, translate component 126 may be configured to translate and/or convert between user identifiers within online gaming platform 105 and user identifiers (e.g., user account identifiers or user account addresses) within blockchain 117. In some implementations, translate component 126 may be configured to translate and/or convert between asset identifiers within online gaming platform 105 and asset identifiers within blockchain 117 (for assets that are not fungible).

Authorization component 136 may be configured to receive information and/or authorization from users 123. In some implementations, the received authorization may pertain to one or more other steps and/or moments during the process of a transferal or exchange. In some implementations, authorization component 136 may receive authorization from the original owner before completion of a transferal.

Figure 3:
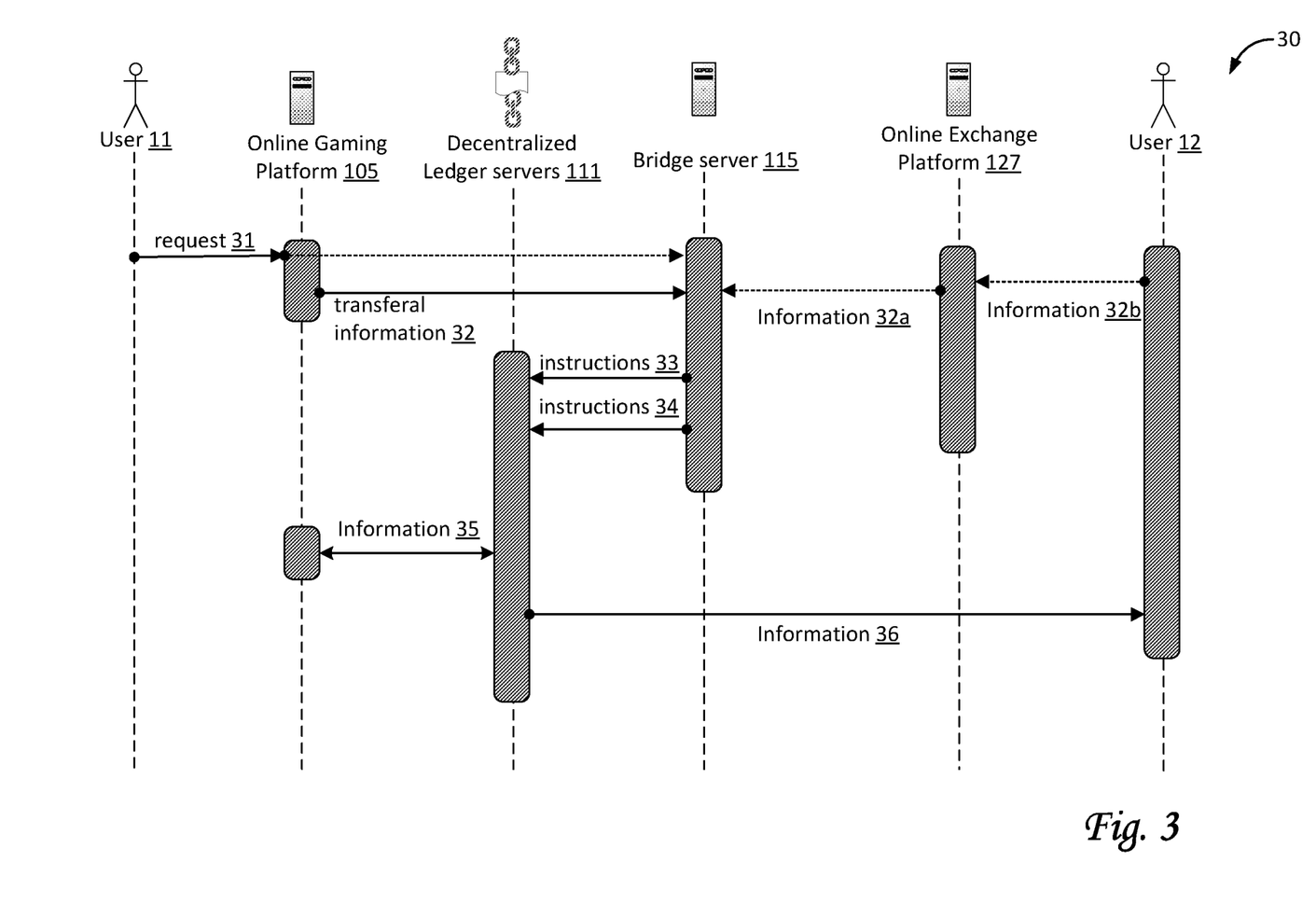
FIG. 3 illustrates an exemplary timing diagram of actions as may occur in a system as described, in accordance with one or more implementations.

By way of non-limiting example, FIG. 3 illustrates an exemplary timing diagram 30 of actions as may occur in a system similar to or the same as system 100. A first action in timing diagram 30 represents an exchange request 31 from a user 11 to one or more of online gaming platform 105 and/or bridge server 115. Subsequent to request 31, transferal information 32 is received by bridge server 115. Bridge server 115 provides a first set of instructions 33 to a first decentralized ledger server 111 (e.g., 111a in FIG. 1), and a second set of instructions 34 to a second decentralized ledger server 111 (e.g., 111b in FIG. 1). In accordance with the received set of instructions, the ownership rights of a particular in-game digital asset are removed from the first decentralized ledger server 111 (e.g., 111a in FIG. 1), and added to the second decentralized ledger server 111 (e.g., 111b in FIG. 1). Information 35 may be exchanged between bridge server 115 and online gaming platform 105 to confirm and/or provide a notification regarding the transferal of the particular digital asset. Information 36 may be provided to user 12 as the new owner of the particular digital asset. In some implementations, the receipt of transferal information 32 may occur subsequent to receipt of information 32a by bridge server 115, from online exchange platform 127, e.g., in case of a sales transaction involving the particular digital asset. In turn, the receipt of information 32a may occur subsequent to receipt of information 32b by online exchange platform 127, from user 12, e.g., in case of a payment by user 12. In some implementations, user 11 may be notified upon completion of the transferal of the particular digital asset. Actions in accordance with this disclosure may include additional and/or different actions and/or steps then depicted in FIG. 3, which is merely intended to be exemplary.

Figure 4A:
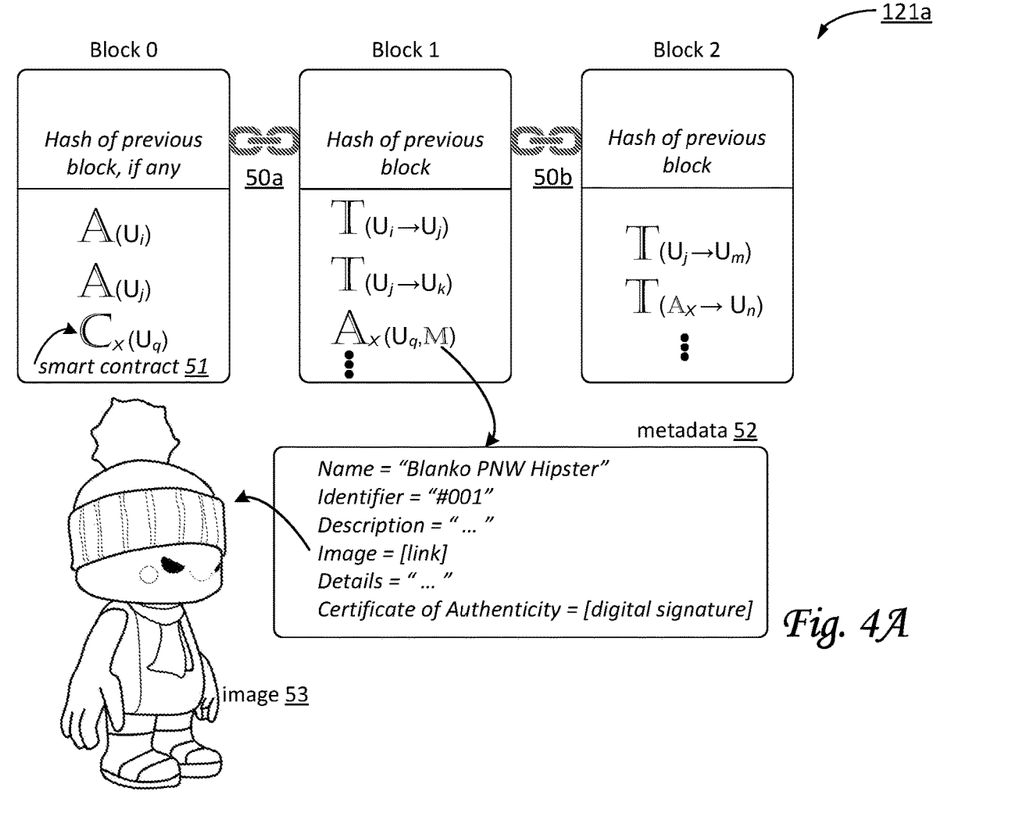
FIGS. 4A-4B illustrate exemplary blockchains as may be used by a system configured for operating a bridge server to support multiple shards of blockchains, in accordance with one or more implementations.

By way of non-limiting example, FIG. 4A illustrates a shard 121a of a particular blockchain that implements part of a blockchain including a block 0, a block 1, and a block 2. As time progresses, more blocks may be added to shard 121a. The blocks within shard 121a are ordered. As shown in block 0, three assets (indicated by a capital "A" or "C") are created and/or generated, and subsequently assigned to three users or players: a first asset is assigned to user i (Ui), a second asset is assigned to user j (Uj), and a third asset is a smart contract 41 (indicated by a capital "C") that is assigned to or owned by user q (Uq). Smart contract 41 may implement a limited number of digital assets of a given type "X". A function call to a function defined by smart contract 41 (e.g., to request a particular type of usage, creation, and/or issuance of a digital asset of type "X") may be depicted and/or implemented as a transaction (e.g., the function may be invoked in exchange for consideration). In some implementations, smart contract 41 may have been posted to shard 121a by (or on behalf of) an owner or creator (here, user q). As used in the context of blockchains, assignments may record ownership. These assets and smart contracts may be individually manifested, deployed, and/or instantiated through a record component similar to record component 112 (see FIG. 1). Block 1 is connected to block 0 (as indicated by a link 50a), for example by including an address of block 1 in block 0, or vice versa. Likewise, block 1 is connected to block 2, as indicated by a link 50b.

In block 1, at least one asset (labeled Ax) is assigned to user q (Uq), for example by associating an address of user q with asset Ax. Asset Ax may represent an individual digital asset of type "X". Asset Ax may be created and/or issued by invoking one or more function calls to smart contract 41. In some implementations, a single function calls may issue multiple assets of the same type to user q. Asset Ax may have associated metadata 52 (indicated by a capital "M"), which may include and/or link to different types of information, including but not limited to one or more of a name, identifier, description, an image 53, (in-game) details, certificate of authenticity, and/or other information, as depicted. For example, the certificate of authenticity may be a digital signature. Additionally, block 1 includes two transactions (indicated by a capital "T"): a first transaction from user i to user j, and a second transaction from user j to user k. Block 2 includes a first transaction from user j to user m, and a second transaction from user q to user n. Here, the second transaction may cause asset Ax to be removed from shard 121a and added to shard 121b in FIG. 4B. In some implementations, based on the contents of the blocks, any user of shard 121a and/or the particular blockchain may determine the current assets of shard 121a, and the balances of any user. In some implementations, the balance of a particular user may be verified prior to adding a transaction that reduces that particular user's balance. For example, an individual user may not be allowed to transfer assets the individual user does not own.

Figure 4B:
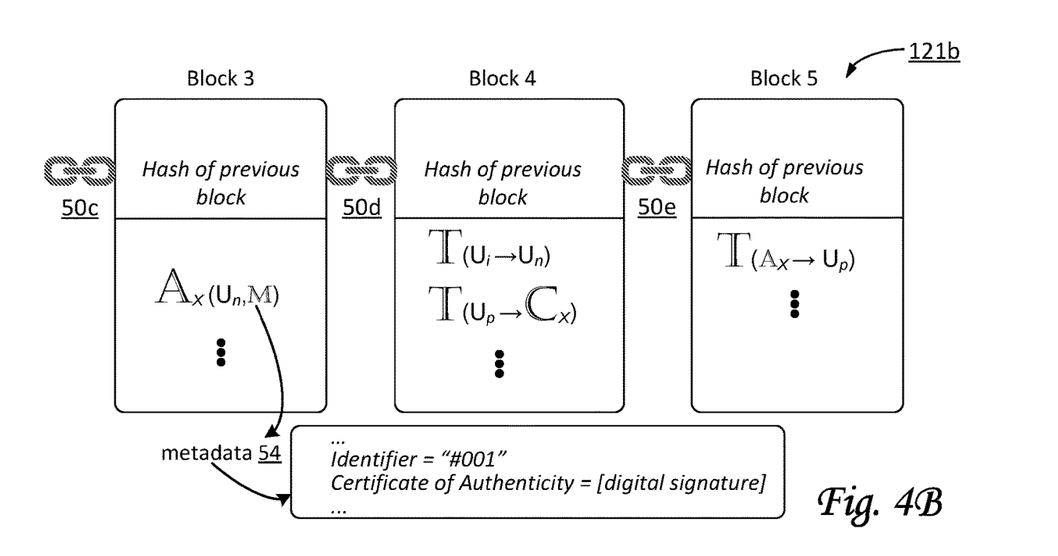

By way of non-limiting example, FIG. 4B illustrates a shard 121b of the particular blockchain that includes block 3, block 4, block 5. Block 3 may be connected to some previous block as indicated by a link 50c, block 4 may be connected to block 3 (as indicated by a link 50d), and block 5 may be connected to block 4 (as indicated by a link 50e). In block 3, asset Ax (having associated metadata 44) of type "X" is issued to user n (Un) and thus added to shard 121b, due to the transaction from user q to user n as described for shard 121a (i.e., this particular asset was removed from shard 121a). Block 4 includes two transactions (indicated by a capital "T"): a first transaction from user i to user n. For example, the transaction may represent a purchase of a first virtual item by user n. Additionally, block 4 includes a second transaction from user q to the same smart contract as depicted in block 0. For example, the second transaction may represent user q offering to exchange a different digital asset of the given type "X" for a particular benefit (assuming user q owns another digital asset of this type). A user who agrees to provide the requested particular benefit may receive limited and temporary ownership rights to this different digital asset (whether this happens is not depicted in FIG. 4B). Block 5 includes a transaction (indicated by a capital "T"), representing a transfer of ownership of the particular digital asset of the given type "X" from owner user n to new owner user p. For example, the transaction in block 5 may be completed within shard 121b such that ownership rights to the particular digital asset remain within shard 121b. In such a case, no asset will need to be removed from shard 121b or added to another shard. In some implementations, decisions regarding which shard a particular digital asset will be recorded on may be made by bridge server 115.

Referring to FIG. 1, user interfaces 125 may be configured to facilitate interaction between users 123 and system 100 and/or between users 123 and client computing platforms 104. For example, user interfaces 125 may provide an interface through which users 123 may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, one or more user interfaces 125 may be included in one or more client computing platforms 104. In some implementations, one or more user interfaces 125 may be included in system 100. In some implementations, user interface 125 may be a type of interface that facilitates the exchange of virtual items between users.

Referring to FIG. 1, in some implementations, server(s) 102, client computing platform(s) 104, and/or external resources 128 may be operatively linked via one or more electronic communication links. For example, such electronic communication links may be established, at least in part, via one or more networks 13, including but not limited to the Internet and/or other networks. It will be appreciated that this is not intended to be limiting, and that the scope of this disclosure includes implementations in which server(s) 102, client computing platform(s) 104, and/or external resources 128 may be operatively linked via some other communication media.

A given client computing platform 104 may include one or more processors configured to execute computer program components. The computer program components may be configured to enable an expert or user associated with the given client computing platform 104 to interface with system 100 and/or external resources 128, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a smart watch, a gaming console, and/or other computing platforms.

External resources 138 may include sources of information outside of system 100, external entities participating with system 100, and/or other resources. For example, in some implementations, external resources 138 may include an online financial platform through which users may access financial information and/or perform financial transactions. In some implementations, some or all of the functionality attributed herein to external resources 138 may be provided by resources included in system 100.

Server(s) 102 may include electronic storage 130, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 113, 114, 116, 118, 120, 124, 126, 128, and/or 136, and/or other components. Processor(s) 132 may be configured to execute components 108, 110, 112, 113, 114, 116, 118, 120, 124, 126, 128, and/or 136, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 113, 114, 116, 118, 120, 124, 126, 128, and/or 136 are illustrated in FIG. 1 as being implemented within particular components, in implementations in which processor(s) 132 includes multiple processing units, one or more of components 108, 110, 112, 113, 114, 116, 118, 120, 124, 126, 128, and/or 136 may be implemented remotely from the other components. The description of the functionality provided by the different components 108, 110, 112, 113, 114, 116, 118, 120, 124, 126, 128, and/or 136 described below is for illustrative purposes, and is not intended to be limiting, as any of components 108, 110, 112, 113, 114, 116, 118, 120, 124, 126, 128, and/or 136 may provide more or less functionality than is described. For example, one or more of components 108, 110, 112, 113, 114, 116, 118, 120, 124, 126, 128, and/or 136 may be eliminated, and some or all of its functionality may be provided by other ones of components 108, 110, 112, 113, 114, 116, 118, 120, 124, 126, 128, and/or 136. As another example, processor(s) 132 may be configured to execute one or more additional components that may perform some or all of the functionality attributed below to one of components 108, 110, 112, 113, 114, 116, 118, 120, 124, 126, 128, and/or 136.

Figure 2:
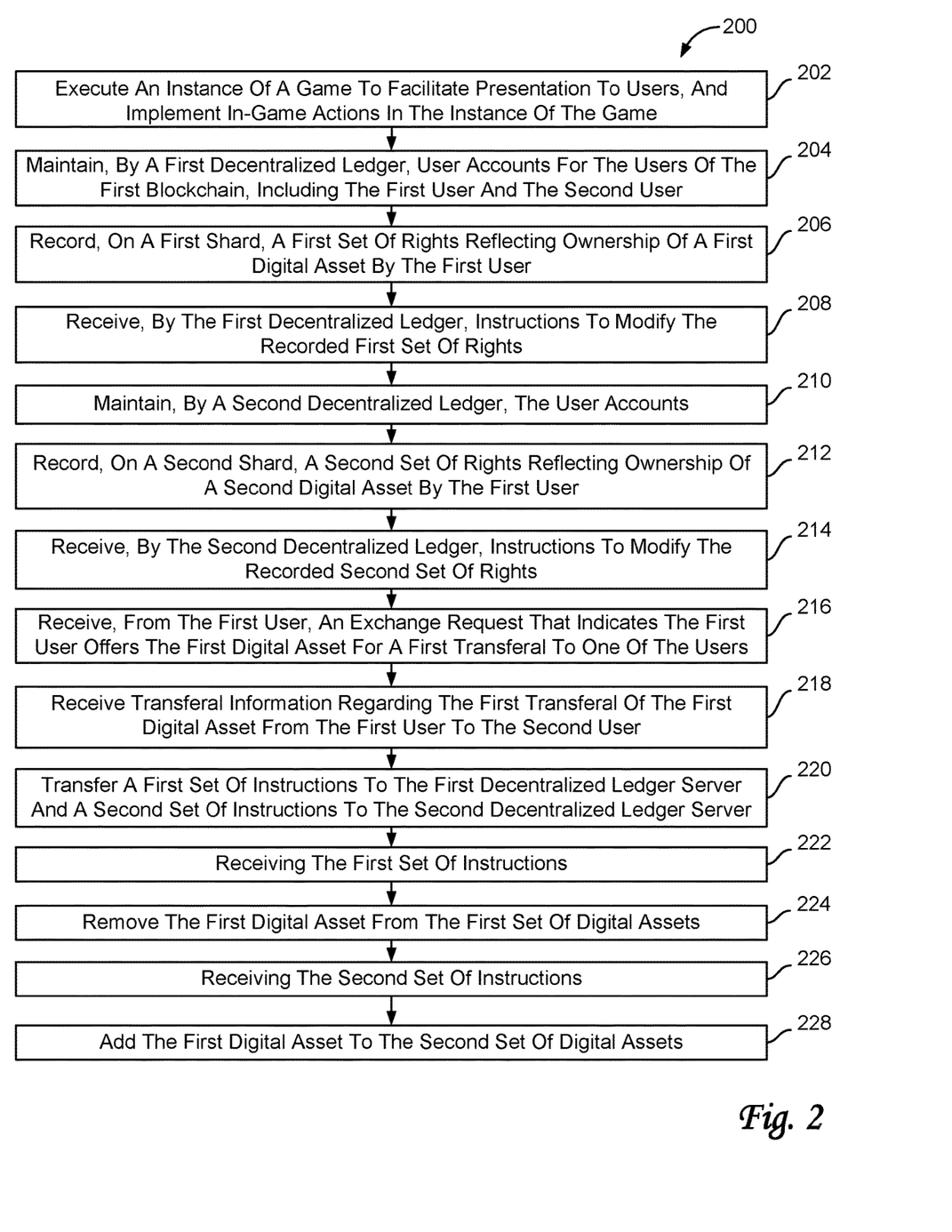
FIG. 2 illustrates a method for operating a bridge server to support multiple shards of blockchains, in accordance with one or more implementations.

FIG. 2 illustrates a method 200 for operating a bridge server to support multiple shards of blockchains, wherein the multiple shards are used to record ownership rights of in-game digital assets, wherein the in-game digital assets are usable in an online gaming platform, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of a first online game is executed to facilitate presentation of the first online game to users, and in-game actions are implemented in the instance of the first online game in response to action requests for the in-game actions by the users. The presentation of the first online game includes the presentation of views of the first online game that are determined using information generated by execution of the instance of the first online game. The users include a first user and a second user that interact with the online gaming platform. In some embodiments, operation 202 is performed by a game component the same as or similar to game component 108 (shown in FIG. 1 and described herein).

At an operation 204, user accounts are maintained, by a first decentralized ledger that implements a first node of a first shard of a first blockchain, for the users of the first blockchain, including the first user and the second user. In some embodiments, operation 204 is performed by an account component the same as or similar to account component 113 (shown in FIG. 1 and described herein).

At an operation 206, on the first shard, a first set of rights is recorded pertaining to a first set of digital assets. The recorded first set of rights reflect ownership of a first digital asset by the first user. The first digital asset is usable within the online gaming platform. In some embodiments, operation 206 is performed by a record component the same as or similar to record component 112 (shown in FIG. 1 and described herein).

At an operation 208, by the first decentralized ledger, instructions are received to modify the recorded first set of rights. In some embodiments, operation 208 is performed by an instruction component the same as or similar to instruction component 114 (shown in FIG. 1 and described herein).

At an operation 210, user accounts are maintained by a second decentralized ledger that implements a second node of a second shard of the first blockchain, including the first user and the second user. In some embodiments, operation 210 is performed by an account component the same as or similar to account component 113 (shown in FIG. 1 and described herein).

At an operation 212, on the second shard, a second set of rights is recorded pertaining to a second set of digital assets. The recorded second set of rights reflect ownership of a second digital asset by the first user. The second digital asset is usable within the online gaming platform. In some embodiments, operation 212 is performed by a record component the same as or similar to record component 112 (shown in FIG. 1 and described herein).

At an operation 214, by the second decentralized ledger, instructions are received to modify the recorded second set of rights. In some embodiments, operation 214 is performed by an instruction component the same as or similar to instruction component 114 (shown in FIG. 1 and described herein).

At an operation 216, from the first user, an exchange request is received that indicates the first user offers the first digital asset for a first transferal to one of the users. In some embodiments, operation 216 is performed by an exchange request component the same as or similar to exchange request component 116 (shown in FIG. 1 and described herein).

At an operation 218, transferal information is received regarding the first transferal of the first digital asset from the first user to the second user. In some embodiments, operation 218 is performed by a transferal component the same as or similar to transferal component 124 (shown in FIG. 1 and described herein).

At an operation 220, responsive to receipt of the transferal information, a first set of instructions is transferred to the first decentralized ledger server and a second set of instructions to the second decentralized ledger server. In some embodiments, operation 220 is performed by a transfer component the same as or similar to transfer component 128 (shown in FIG. 1 and described herein).

At an operation 222, the first set of instructions is received. In some embodiments, operation 222 is performed by an instruction component the same as or similar to instruction component 114 (shown in FIG. 1 and described herein).

At an operation 224, in accordance with the received first set of instructions, the first digital asset is removed from the first set of digital assets, such that the recorded first set of rights on the first shard no longer reflect the ownership of the first digital asset by the first user. In some embodiments, operation 224 is performed by a record component the same as or similar to record component 112 (shown in FIG. 1 and described herein).

At an operation 226, the second set of instructions is received. In some embodiments, operation 226 is performed by an instruction component the same as or similar to instruction component 114 (shown in FIG. 1 and described herein).

At an operation 228, in accordance with the received second set of instructions, the first digital asset is added to the second set of digital assets, such that the recorded second set of rights on the second shard reflect the ownership of the first digital asset by the second user. In some embodiments, operation 228 is performed by a record component the same as or similar to record component 112 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for operating a bridge server to support multiple asset-specific shards of blockchains while limiting overhead for communication between different ones of the multiple asset-specific shards, wherein the multiple asset-specific shards are used to record ownership rights of different and mutually exclusive sets of in-game digital assets, wherein the in-game digital assets are usable in an online gaming platform, comprising:

an online gaming platform configured to host one or more games, the online gaming platform including one or more processors configured by machine-readable instructions to:

execute an instance of a first online game, and present the first online game to users, wherein presenting the first online game includes presentation of views of the first online game that are determined during execution of the instance of the first online game, wherein the users include a first user and a second user;

receive, from the first user, an action request to perform one or more in-game actions in the first online game;

a first decentralized ledger server configured to implement a first node of a first shard of a first blockchain, wherein the first decentralized ledger server includes one or more processors configured by machine-readable instructions to:

maintain user accounts for the users of the first blockchain, including the first user and the second user;

record, on the first shard, a first set of rights pertaining to a first set of digital assets owned by different users, wherein the first set of digital assets includes a first digital asset, wherein the recorded first set of rights reflect ownership of the first digital asset by the first user, wherein the first digital asset is configured to be used within the online gaming platform; and receive instructions to modify the recorded first set of rights with regard to the ownership of the first digital asset;

a second decentralized ledger server configured to implement a second node of a second shard of the first blockchain, wherein the second decentralized ledger server includes one or more processors configured by machine-readable instructions to:

maintain user accounts for the users of the first blockchain, including the first user and the second user;

record, on the second shard, a second set of rights pertaining to a second set of digital assets owned by the different users, wherein the second set of digital assets is mutually exclusive with the first set of digital assets; and receive instructions to modify the recorded second set of rights pertaining to one or more digital assets in the second set of digital assets;

the bridge server, including one or more processors configured by machine-readable instructions to:

translate the one or more in-game actions that have been performed in the first online game into one or more transactions that are to be recorded on the first shard or the second shard, wherein the one or more transactions create a new digital asset owned by the first user;

determine whether rights reflecting ownership of the new digital asset are to be recorded on either the first shard or the second shard;

responsive to determining that the rights reflecting the ownership of the new digital asset are to be recorded on the first shard, transfer a first set of instructions to the first decentralized ledger server;

responsive to determining that the rights reflecting the ownership of the new digital asset are to be recorded on the second shard, transfer a second set of instructions to the second decentralized ledger server;

wherein the one or more processors of the first decentralized ledger server are further configured to (i) responsive to determining that the rights reflecting the ownership of the new digital asset are to be recorded on the first shard, receive the first set of instructions from the bridge server, and (ii) in accordance with the received first set of instructions, record the ownership of the new digital asset on the first shard as being owned by the first user; and wherein the one or more processors of the second decentralized ledger server are further configured to (i) responsive to determining that the rights reflecting the ownership of the new digital asset are to be recorded on the second shard, receive the second set of instructions from the bridge server, and (ii) in accordance with the received second set of instructions, record the ownership of the new digital asset on the second shard as being owned by the first user, and further such that the recorded first set of digital assets on the first shard remains mutually exclusive with the recorded second set of digital assets on the second shard.

2. The system of claim 1, wherein the first node is dedicated to the first shard, and wherein the second node is dedicated to the second shard of the first blockchain.

3. The system of claim 1, wherein the first digital asset represents a three-dimensional in-game user-controllable character configured to interact with other virtual items within the online gaming platform, wherein the first digital asset is not fungible.

4. The system of claim 1, wherein the one or more processors included in the bridge server are further configured by the machine-readable instructions to:

translate an additional in-game action that has been performed in the first online game into an additional transaction to be recorded, wherein the additional transaction creates a second new digital asset owned by the second user; and determine whether second rights reflecting ownership of the second new digital asset are to be recorded on the first shard or the second shard;

responsive to determining that the second rights reflecting the ownership of the second new digital asset are to be recorded on the first shard, transfer an additional first set of instructions to the first decentralized ledger server;

responsive to determining that the second rights reflecting the ownership of the second new digital asset are to be recorded on the second shard, transfer an additional second set of instructions to the second decentralized ledger server;

wherein the one or more processors of the first decentralized ledger server are further configured to (i) receive the additional first set of instructions from the bridge server, and (ii) record the ownership of the second new digital asset on the first shard as being owned by the second user;

wherein the one or more processors of the second decentralized ledger server are further configured to (i) receive the additional second set of instructions from the bridge server, and (ii) record the ownership of the second new digital asset on the second shard as being owned by the second user, and wherein the recorded first set of digital assets on the first shard remains mutually exclusive with the recorded second set of digital assets on the second shard.

5. A method for operating a bridge server to support multiple asset-specific shards of blockchains, wherein the multiple asset-specific shards are used to record ownership rights of different and mutually exclusive sets of in-game digital assets, wherein the in-game digital assets are usable in an online gaming platform, the method being implemented in a computer-implemented system, the method comprising:

executing an instance of a first online game, and presenting the first online game to users, wherein presenting the first online game includes presentation of views of the first online game that are determined during execution of the instance of the first online game, wherein the users include a first user and a second user that interact with the online gaming platform;

receiving, from the first user, an action request to perform one or more in-game actions in the first online game;

maintaining, by a first decentralized ledger server that implements a first node of a first shard of a first blockchain, user accounts for the users of the first blockchain, including the first user and the second user;

recording, on the first shard, a first set of rights pertaining to a first set of digital assets owned by different users, wherein the first set of digital assets includes a first digital asset, wherein the recorded first set of rights reflect ownership of the first digital asset by the first user, wherein the first digital asset is configured to be used within the online gaming platform;

maintaining, by a second decentralized ledger server that implements a second node of a second shard of the first blockchain, user accounts for the users of the first blockchain, including the first user and the second user;

recording, on the second shard, a second set of rights pertaining to a second set of digital assets owned by the different users, wherein the second set of digital assets is mutually exclusive with the first set of digital assets;

translating the one or more in-game actions that have been performed in the first online game into one or more transactions that are to be recorded on the first shard or the second shard, wherein the one or more transactions create a new digital asset owned by the first user;

determining whether rights reflecting ownership of the new digital asset are to be recorded on either the first shard or the second shard;

responsive to determining that the rights reflecting the ownership of the new digital asset are to be recorded on the first shard, transferring a first set of instructions to the first decentralized ledger server;

responsive to determining that the rights reflecting the ownership of the new digital asset are to be recorded on the second shard, transferring a second set of instructions to the second decentralized ledger server;

receiving, by the first decentralized ledger server, the first set of instructions, responsive to determining that the rights reflecting the ownership of the new digital asset are to be recorded on the first shard;

in accordance with the received first set of instructions, recording the ownership of the new digital asset on the first shard as being owned by the first user;

receiving, by the second decentralized ledger server, the second set of instructions, responsive to determining that the rights reflecting the ownership of the new digital asset are to be recorded on the second shard; and in accordance with the received second set of instructions, recording the ownership of the new digital asset on the second shard as being owned by the first user, wherein the recorded first set of digital assets on the first shard remains mutually exclusive with the recorded second set of digital assets on the second shard.

6. The method of claim 5, wherein the first digital asset represents a three-dimensional in-game user-controllable character that can interact with other virtual items within the online gaming platform, wherein the first digital asset is not fungible.

* * * * *